US006513320B1

(12) United States Patent
Nishimura et al.

(10) Patent No.: US 6,513,320 B1
(45) **Date of Patent: *Feb. 4, 2003**

(54) CONTROL SYSTEM FOR A DIRECT INJECTION-SPARK IGNITION ENGINE

(75) Inventors: Hirofumi Nishimura, Hiroshima (JP); Youichi Kuji, Hiroshima (JP)

(73) Assignee: Mazda Motor Corporation, Hiroshima (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/199,448

(22) Filed: Nov. 25, 1998

(30) Foreign Application Priority Data

Sep. 29, 1998 (JP) .......................................... 10-274628

(51) Int. Cl.[7] .......................... F02D 41/40; F02D 43/00
(52) U.S. Cl. .......................................... 60/285; 123/299
(58) Field of Search ................................ 123/295, 299, 123/300; 60/285

(56) References Cited

U.S. PATENT DOCUMENTS 4,535,739 A * 8/1985 Kudo et al. ............ 123/406.35
5,479,775 A 1/1996 Kraemer et al.
5,713,328 A * 2/1998 Anderson et al. ........... 123/299
5,794,585 A * 8/1998 Yonezawa et al. .......... 123/299
6,055,956 A * 5/2000 Nishimura et al. ......... 123/299
6,067,954 A * 5/2000 Kudou et al. ............... 123/299
6,085,718 A * 7/2000 Nishimura et al. ......... 123/295
6,116,208 A * 9/2000 Nishimura et al. ......... 123/295
6,257,197 B1 * 7/2001 Nishimura et al. ......... 123/295

FOREIGN PATENT DOCUMENTS

| | | | |
|---|---|---|---|
| DE | 196 36 507 A1 | 3/1997 | |
| EP | 0 661 432 A2 | 7/1995 | |
| JP | 62 271940 A | 11/1987 | |
| JP | 7-119507 | 5/1995 | ........... F02D/41/02 |
| JP | 7-217478 | 8/1995 | ........... F02D/41/04 |
| WO | WO 93/07363 | 4/1993 | ............. F01N/3/18 |
| WO | WO96/22457 A | 7/1996 | |

OTHER PUBLICATIONS

European Search Report EP 98 30 9722, Nov. 7, 2000.

* cited by examiner

*Primary Examiner*—Andrew M. Dolinar
(74) *Attorney, Agent, or Firm*—Nixon Peabody LLP; Donald R. Studebaker

(57) ABSTRACT

An engine control system for a direct injection-spark ignition type of engine which is equipped with a fuel injector for spraying fuel directly into a combustion chamber and an exhaust system having a lean NOx conversion catalyst for lowering an emission level of nitrogen oxides (NOx) in exhaust gas at an air-fuel ratio of $\lambda>1$ controls divides a given amount of fuel into two parts which are intermittently delivered through early and late split injection respectively in a intake stroke and controls a fuel injector such that a midpoint between points at which the early and late split injection are timed respectively to start is before a midpoint of a intake stroke while the engine is in a lean fuel charge zone.

13 Claims, 15 Drawing Sheets

MC
ACCELERATOR POSITION SENSOR
Ss
41
42
1
2
3
4
5
6
7
8
9
10
11
12
14
15
16
17
18
19
20
21
22
25
26
27
28
29
30
31
32
33
34
37
38
39
43
44

START
S101
READ IN SIGNALS :
Ne,Tv,Qa,Tw,Ss
S102
ENGINE
START ?
No
Yes
S103
CALCULATION OF TaK
FOR ENGINE START
S104
TaK1=c x TaK
TaK2=(1-c) x TaK
TaK3=0
TaD =0
S105
DETERMINATION OF
INJECTION TIMING s1,s2
1
S106
Tw > Two
No
2
Yes
S107
IN ZONE I ?
No
3
Yes
S108
CALCULATION OF TaD
FOR LEAN STRATIFIED
CHARGE
S109
TaK1=0
TaK2=0
TaK3=0
S110
DETERMINATION OF
INJECTION TIMING s4
S111
INJECTION
TIMING s4 ?
No
Yes
S112
INJECTION WITH
PULSE WIDTH TaD
4

5
S126
CALCULATION OF TaK
FOR ENRICHED HOMOGENEOUS
CHARGE
S127
TaK1 =0
TaK2 =0
TaK3 =TaK
TaD =0
S128
DETERMINATION OF
INJECTION TIMING s3
S129
INJECTION
TIMING s3 ?
No
Yes
S130
INJECTION WITH
PULSE WIDTH TaK3
7

6
S118
INJECTION WITH
PULSE WIDTH TaK1
S119
INJECTION
TIMING s2 ?
No
Yes
S120
INJECTION WITH
PULSE WIDTH TaK2
4
7
RETURN

SUCTION STROKE
COMPRESSION STROKE
(a) FUEL CHARGE CONTROL ZONE I
(b) FUEL CHARGE CONTROL ZONE II,III,A
(c) FUEL CHARGE CONTROL ZONE IV,V,B,C
0° TDC
s1
ms4s2 M (90°)
180 BDC
s3
0° TDC
CRANK ANGLE

CONTROL SYSTEM FOR A DIRECT INJECTION-SPARK IGNITION ENGINE

BACKGROUND OF THE INVENTION

1. Field of the Invention

The invention relates to an engine control system for a direct injection-spark ignition type of engine equipped with a lean NOx conversion catalyst in the exhaust line, and, in particular, to a direct injection-spark ignition engine control system which operates the engine with a fuel charge changed between lean and rich.

2. Description of the Related Art

Engine control system of this type incorporate in an exhaust line a NOx adsorbing type of lean NOx conversion catalyst which, on one hand, adsorbs NOx in the exhaust gas while the air-fuel mixture is leaner than a stoichiometric mixture and, on the other hand, desorbs or releases the NOx into exhaust gas for catalyzing reduction of the NOx while the air-fuel mixture is richer than a stoichiometric mixture. As is known from, for example, International Patent Application WO93/07363, such an engine control system controls the engine to operate with an enriched mixture under accelerating conditions or full loading operating conditions and with a lean mixture under the remaining operating conditions, so as to improve fuel consumption.

An engine control system for a direct injection-spark ignition type of engine known from, for example, Japanese Unexamined Patent Publication 7-119507 controls the engine to cause stratified charge combustion in a lower engine loading zone and homogeneous charge combustion in a high engine loading zone. While the engine operates with lower speeds in the high loading zone, a given amount of fuel is delivered in two steps through early and late split injection in a intake stroke, so as to diffuse a first half of fuel sprayed through the early split injection in the combustion chamber before the end of a intake stroke and the second half of fuel in the combustion chamber with its volume increased, This prevents a generation of rich or dense mixture over the top of a piston in a subsequent compression stroke that generally occurs when a given amount of fuel is sprayed all at once through non-split injection, which is desirable to prevent generation of smoke.

Another engine control system for a direct injection-spark ignition engine cooperates with a fuel injector which is direct to face the top of a piston and energized to spray a small amount of fuel preparatorily at the beginning of a intake stroke when the engine causes knocking. The fuel partly sticks to the top wall of the piston on a side of an intake port and bounces off the piston wall toward the intake port to cool the piston head and the combustion chamber on the intake port side with the heat of vaporization of the fuel. Such an engine control system is known from, for example, Japanese Unexamined Patent Publication 7-217478.

A lean NOx conversion catalyst disposed in an exhaust line as described in the International Patent Application WO93/07363 declines its NOx conversion performance as the temperature of exhaust gas rises. In particular, a NOx adsorption type of lean NOx conversion catalyst shows significant aggravation of NOx conversion performance. In order to keep or enhance the NOx conversion performance, it is desirable to increase combustion velocity of fuel by improving the homogeneity of fuel distribution in the combustion chamber and drop the temperature of exhaust gas as low as possible by rising the combustion efficiency of fuel mixture. However, these demands are not satisfied in the present circumstances.

SUMMARY OF THE INVENTION

It is an objective of the invention to provide an engine control system for a direct injection-spark ignition type of engine which rises a combustion velocity of fuel by providing an improved homogeneous distribution of the fuel with an effect of rising combustion efficiency so as to drop the temperature of exhaust gas as low as possibly.

The foregoing object of the present invention are achieved by providing an engine control system operative to control a direct injection-spark ignition type of engine which is equipped with a fuel injector for delivering fuel directly into a combustion chamber and an exhaust system having a lean NOx conversion catalyst for lowering an emission level of nitrogen oxides (NOx) in exhaust gas at an air-fuel ratio of $\lambda>1$ such that the engine makes stratified charge combustion in a lower engine loading zone and homogeneous charge combustion in a zone other than the lower engine loading zone. While the engine is monitored to be in a homogeneous charge combustion zone, the engine control system divides a given amount of fuel into two parts, desirably two substantially equal parts, and energizes the fuel injector to intermittently deliver through early and late split injection respectively in a intake stroke and controls the fuel injector to such that a midpoint between points at which said early and late split injection are timed respectively to start is before a midpoint of a intake stroke.

According to the engine control system, while a part of fuel delivered through the early split injection is sufficiently diffused sufficiently homogeneously in the combustion chamber whose volume increases as the piston moves down before the late split injection is started, another part of fuel subsequently delivered through the late split injection is diffused and made homogeneous in the combustion chamber whose volume has sufficiently increased. In consequence, a homogeneous fuel mixture is generated in the combustion chamber with an effect of increasing combustion velocity and combustion efficiency in a combustion stroke, providing a drop in exhaust gas temperature. The control in which fuel injection is made such that the midpoint between points at which the early and late split injection are timed respectively to start is before the midpoint of a intake stroke provides various prominent effects described below.

On condition that a given amount of fuel has to be injected within an entire intake stroke, the early split injection can be timed to be caused at a point at which the piston moves down at a relatively high speed, which is accompanied by generation of a strong intake air stream, accelerating accomplishment of a homogeneous distribution of fuel mixture and evaporation of fuel. The early and late split injection is off as one whole to the early side of a intake stroke and, in consequence, fuel delivered through the late split injection sticks to a cylinder wall near when the piston reaches its bottom-dead-center (at the end of a intake stroke), so as to evade tardy accomplishment of a homogeneous distribution of fuel mixture. In addition, there is certainly provided a long period of time allowed for a fuel mixture to evaporate before spark ignition of the fuel mixture and a rise in intake air temperature by recirculated exhaust gas, which are always desirable for acceleration of fuel evaporation. These effects mutually affect one another to produce a greatly improved homogeneous distribution of fuel and significantly improving combustion efficiency of fuel mixture due to a shortened combustion time, lowering the temperature of exhaust gas.

In the zone other than the lower engine loading zone, the engine control system may control the engine to operates with a fuel mixture enriched to be $\lambda<1$ while the engine is in a cold condition as well as in a warm condition. Even while the engine is in a cold condition where fuel is slow of evaporation and combustion, the split injection in a intake stroke makes fuel acceleratingly evaporate with an effect of improving combustibility of an enriched fuel mixture. Further, in the zone other than the lower engine loading zone, the engine control system may control the engine to operates with a fuel mixture of $\lambda>1$ while the engine is in a warm condition. This provides an improved homogeneous distribution of fuel sufficient to expand a limit of air-fuel ratio for a lean fuel mixture, lowering specific fuel consumption and the amount of NOx formation. The split injection may be made during an engine start, which is desirable to accelerate evaporation of fuel and prevents the engine from being operated with an overly enriched fuel mixture during a start, so that both startability of the engine and combustibility of lean fuel mixture are realized.

According to another embodiment of the invention, the engine control system further cooperates with an exhaust gas recirculation system to admit exhaust gas into an intake air stream introduced into the engine while the split injection is made. Because of the improved combustibility of fuel due to the split injection, a large amount of exhaust gas can be recirculated into the combustion chamber, providing a drop in pumping loss sufficiently to lower specific fuel consumption and the temperature of exhaust gas. The exhaust gas recirculation rate may be increased up to 10 to 40%.

The fuel injector disposed off a vertical axis of the combustion chamber sprays fuel in a direction intersecting the vertical axis at an angle, so as to make it easy to stratify a fuel mixture with an effect of improving combustibility of the fuel mixture. Further, the engine control system may incorporate an air stream control means operative to create an air stream in the combustion chamber to accelerate accomplishment of a homogeneous distribution of fuel.

According to another embodiment of the invention, the engine control system cooperates with a direct injection-spark ignition type of engine which is equipped with an exhaust system having a lean NOx conversion catalyst for lowering an emission level of nitrogen oxides (NOx) in exhaust gas at an air-fuel ratio of $\lambda>1$ and controls the engine to operate with a fuel charge of $\lambda>1$ in a zone of partial engine loadings. The control system, while the engine is in the partial engine loading zone, divides a given amount of fuel into two parts, desirably two substantially equal parts, which are intermittently delivered through early and late split injection respectively in a intake stroke. The fuel injector is energized such that the midpoint between points at which the early and late split injection are timed respectively to start is before the midpoint of a intake stroke.

According to still another embodiment of the invention, the engine control system cooperates with a direct injection-spark ignition type of engine which is equipped with an exhaust system having a lean NOx conversion catalyst for lowering an emission level of nitrogen oxides (NOx) in exhaust gas at an air-fuel ratio of $\lambda>1$ and an exhaust gas recirculation system operative to circulate exhaust gas partly into the intake system from said exhaust system and controls the engine to operate with a lean fuel charge in a zone of partial engine loadings and with a fuel mixture enriched to be $\lambda>1$. The control system, while the engine is in the partial engine loading or lean charge combustion zone under a warm engine condition, divides a given amount of fuel into two parts, desirably two substantially equal parts, which are intermittently delivered through early and late split injection respectively in a intake stroke. The fuel injector is energized such that the midpoint between points at which the early and late split injection are timed respectively to start is before the midpoint of a intake stroke, and the exhaust gas recirculation system is caused to admit exhaust gas into an intake air stream introduced into the engine in the partial engine loading zone. When the vehicle proceeds to run under ordinary conditions, the split injection may be made. While the split injection is made, the exhaust gas recirculation system is caused to admit exhaust gas partially into an intake air stream.

In the partial engine loading zone in which the temperature of exhaust gas is generally not risen so high due to an excess of air, the split injection lowers the temperature of exhaust gas even more. Not only during acceleration under which the temperature of exhaust gas tends to rise but during running ordinary conditions under which the temperature of exhaust gas is, if anything, relatively low, the split injection provides a drop in the temperature of exhaust gas as low as possible even during running.

According to a further embodiment of the invention, the engine control system cooperates with a direct injection-spark ignition type of engine which is equipped with an exhaust system having a lean NOx conversion catalyst for lowering an emission level of nitrogen oxides (NOx) in exhaust gas at an air-fuel ratio of $\lambda>1$ and controls the engine to operate with a lean fuel charge in a zone of partial engine loadings and with a fuel mixture enriched to be $\lambda>1$ in a zone other than the lean charge, lower engine loading zone. The control system, when the lean NOx conversion catalyst is monitored to be at a temperature higher than a specified level, divides a given amount of fuel into two parts, desirably two substantially equal parts, which are intermittently delivered through early and late split injection respectively in a intake stroke. The fuel injector is energized such that the midpoint between points at which the early and late split injection are timed respectively to start is before the midpoint of a intake stroke.

While the lean NOx conversion catalyst is at a temperature higher than the specified level, the split injection is made to lower the temperature of exhaust gas, preventing the lean NOx conversion catalyst from being overheated.

In the above embodiments, the late split injection is desirably timed to start at a point in one of first and middle divisions of three substantially equal divisions of a intake stroke. Further, the late split injection is desirably timed and to end at a point at in either one of the first and middle divisions while the engine is monitored to operate in a lower engine speed zone. In these instances, the effect of lowering the temperature of exhaust gas is more enhanced. Further, the late split injection may be timed to a point before the midpoint of a intake stroke at which the cylinder piston attains a maximum down speed. In this instance, the piston moving down at its maximum speed creates a strong intake air stream due to which fuel sprayed through the late split injection is diffused and homogeneously distributed in the entire combustion chamber.

The engine control system which, while the engine is in the partial engine loading, divides a given amount of fuel into two parts which are intermittently delivered through early and late split injection respectively in a intake stroke, energizes the fuel injector such that the midpoint between points at which the early and late split injection are timed respectively to start is before the midpoint of a intake stroke can be of course employed for a direct injection-spark ignition type of engine which is equipped with an exhaust system having a catalyst for purifying exhaust gas with an effect of preventing a rise in the temperature of exhaust gas in excess, and hence the temperature of the catalyst. In consequence, the catalyst is prevented from encounters aggravation of catalytic conversion efficiency, durability and reliability of the catalyst.

BRIEF DESCRIPTION OF THE DRAWINGS

The foregoing and other objects and features of the present invention will be clearly understood from the following detailed description of preferred embodiments when read in conjunction with the accompanying drawings in which.

DETAILED DESCRIPTION OF THE PREFERRED EMBODIMENT

The term "NOx conversion" as used throughout the specification shall mean and refer to a reduction in the NOx content of exhaust gas due such as to NOx adsorption on a NOx adsorption type of catalyst and reduction of NOx to $N_2$ and $O_2$ by a NOx reduction type of catalyst, and the term "lean NOx conversion catalyst" as used throughout the specification shall mean and refer to the type controlling or lowering an emission level of nitrogen oxides (NOx) in a lean exhaust gas whose air-fuel ratio is $\lambda>1$.

Because a direct injection-spark ignition type of gasoline engine is well known, the present description will be directed in particular to elements forming part of, or cooperating directly with, an engine control system in accordance with the present invention. It is to be understood that elements not specifically shown or described can take various forms well known to those skilled in the automobile art.

Figure 1:
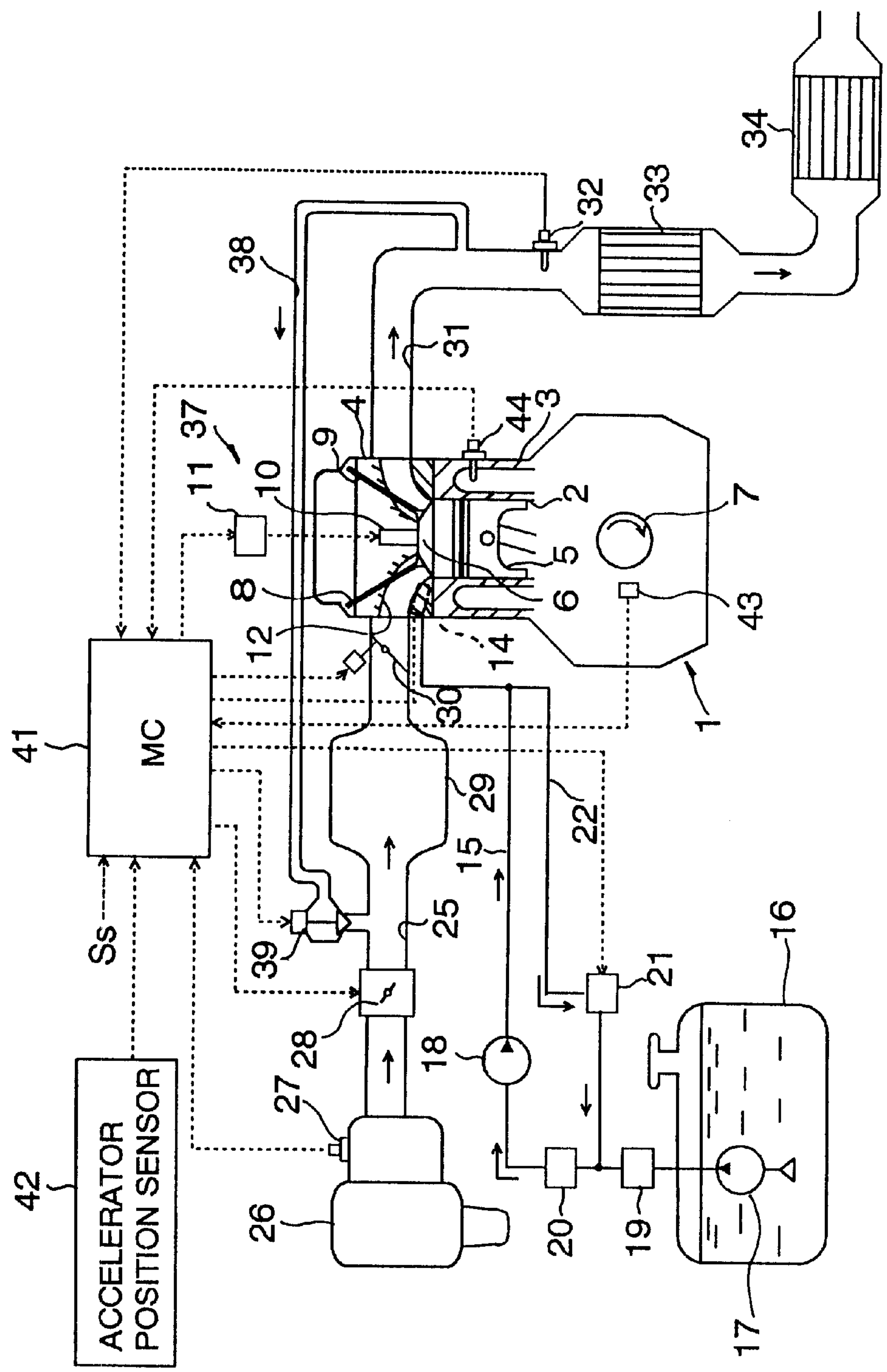
FIG. 1 is a schematic illustration of an engine control system in accordance with an embodiment of the invention.

Referring to the drawings in detail and, in particular, to FIG. 1 showing an engine control system in accordance with an embodiment of the invention, a fuel direct injection type of multiple cylinder engine 1 equipped with exhaust gas recirculation system, which is controlled by the engine control system, is comprised of a cylinder block 3 provided with cylinder bores 2 (only one of which is shown) in which pistons 5 can slide and a cylinder head 4 mounted on the cylinder block 3. A combustion chamber 6 is formed in the cylinder by the top of the piston 5, a lower wall of the cylinder head 4 and the cylinder bore 2. Two intake ports 12 (only one of which is shown) and one exhaust port 13 are opened into the combustion chamber 6, and are opened and shut at a predetermined timing by intake valves 8 and an exhaust valve 9, respectively. A fuel injector 14 is installed into the cylinder head 4 such that a spray of fuel is directly charged into the combustion chamber 6 from the side. The piston 5 at its top cavity (not shown) traps the spray of fuel to form a stratum of relatively dense air-fuel mixture near the spark plug 10, so as thereby to form a stratified charge of air-fuel mixture in the combustion chamber 6. This engine 1 is of a direct injection-spark ignition type. A spark plug 10 is installed in the cylinder head 4 such that electrodes of the spark plug 10 are placed down into the combustion chamber 6 and aligned with the vertical center line of the cylinder and connected to an ignition circuit 11 to ignite an air-fuel mixture in the combustion engine. A fuel line 15, through which the fuel is delivered to the fuel injector 14 from a fuel tank 16 is equipped with two fuel pumps, namely a low pressure fuel pump 17 disposed in the fuel tank 16 and a high pressure fuel pump 18 disposed the outside of the fuel tank 16. The fuel line 15 between the fuel pumps 17 and 18 is further equipped with a low pressure regulator 19 and a fuel filter 20 positioned in this order from the side of fuel tank 16. A fuel return line 22 equipped with a high pressure regulator 21 is connected to the fuel line 15 between a point after the high pressure fuel pump 18 and a point before the fuel filter 20. Fuel is drawn up from the fuel tank 16 by the low pressure pump 17, regulated in pressure by the low pressure regulator 19, and then multiplied in pressurized by the high pressure fuel, pump 18 to the fuel injector 14. The high pressurized fuel is partly delivered to the fuel injector 14 and partly returned through the return fuel line 22. The high pressure regulator 21 regulates a return fuel quantity so as to optimize the pressurized fuel in pressure level directed to the fuel injector 14.

An intake line 25 has an air cleaner 26 at the upstream end and an intake manifold at the downstream end which is independently connected to the intake ports 12 of the cylinder. An intake valve 8 is provided in each intake port 12 and an air stream control valve 30 is provided either one of the intake ports 12 only. The air stream control valve 30, which may be of an actuator operated type, causes an air stream to be admitted into the combustion chamber 6 through only the other intake port 12 while it closes, which results in forming, for example, a swirl of intake air abundant in tumble components in a direction of the vertical axis of the cylinder. The intake line 25 is provided with a heat sensing type of air-flow sensor 27, an electrically controlled throttle valve 28 and a surge tank 29 in order from the upstream end. The throttle valve 28 is not controlled directly by an accelerator pedal but indirectly by an accelerator pedal through an actuator (not shown).

An exhaust line 31 through which exhaust gas are discharged into the atmosphere is provided with an oxygen sensor (which is hereafter referred to as an $O_2$ sensor) 32, a three-way catalyst 33 and a NOx adsorption type of lean NOx conversion catalyst 34 (which may otherwise be of a NOx reduction type) in order from the upstream end. The $O_2$ sensor 32 monitors the oxygen concentration of exhaust gas based on which an air-fuel ratio is determined and provides an output sharply changing on opposite sides of a stoichiometric air-fuel ratio. Each of the catalysts 33 and 34 is of a type using a cordierite honeycomb block coated with a catalytic material which allows exhaust gas to flow through. The three-way catalyst 33 significantly lowers emission levels of hydrocarbons (HC) and carbon monoxide (CO). The lean NOx conversion catalyst 34 adsorbs NOx in exhaust gas even when the air-fuel ratio is $\lambda>1$ as well as lowering emission levels of HC and CO. These three-way catalyst 33 and lean NOx conversion catalyst 34 may be replaced in position with each other. Further, when the lean NOx conversion catalyst 34 is of a double layer type that has a NOx adsorption catalytic layer and a NOx reduction catalytic layer, it is not always necessary to use the three-way catalytic converter.

An exhaust gas recirculation (EGR) system 37 is provided to admit exhaust gas partly into the intake line 25. The exhaust gas recirculation (EGR) system 37 has a recirculation line extending from the exhaust line 31 upstream the $O_2$ sensor 32 to the intake line 25 between the throttle valve 28 and the surge tank 29, and an electrically operated exhaust gas recirculation (EGR) valve 39 installed to the recirculation line 38 in a position close to the intake line 25. The amount of exhaust gas that is recirculated through the recirculation line 38 can be controlled by the EGR valve 39. This EGR valve 39 is designed to admit carefully controlled amounts of exhaust gas into the intake air stream.

Operation of the ignition circuit 11, the fuel injector 14, the high pressure regulator 21, the actuator of the throttle valve 28, the air stream control valve 30, the EGR valve and other electrically operated elements are controlled by a control unit 41 comprising a microcomputer MC. Various signals are transferred to the control unit 41 from at least the air-flow sensor 27, the $O_2$ sensor 32, an accelerator position sensor 42 which detects accelerator positions as engine loading, a crank angle sensor 43 which monitors angles of rotation of a crankshaft 7 of the engine as an engine speed of rotation, a temperature sensor 44 which monitors the temperature of engine cooling water to determine whether the engine 1 is in a cold condition, under a warming up, or in a warm condition, a position sensor (not shown) incorporated in the EGR valve 39 which monitors a valve lift of the EGR valve 39, and an engine starter (not shown). The fuel injector 14 is pulsed to open by energizing a solenoid according to a pulse width. The control unit 41 constantly monitors engine speed, load, throttle position, exhaust, temperature, etc to control the pulse width according to a fuel injection control map.

Figure 2:
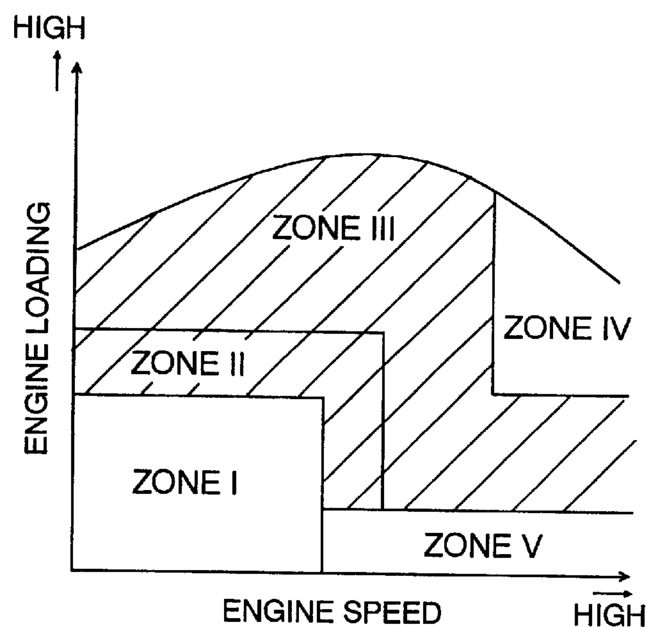
FIG. 2 is a diagram illustrating a map of fuel injection control zones for warm engine operation.
Figure 3:
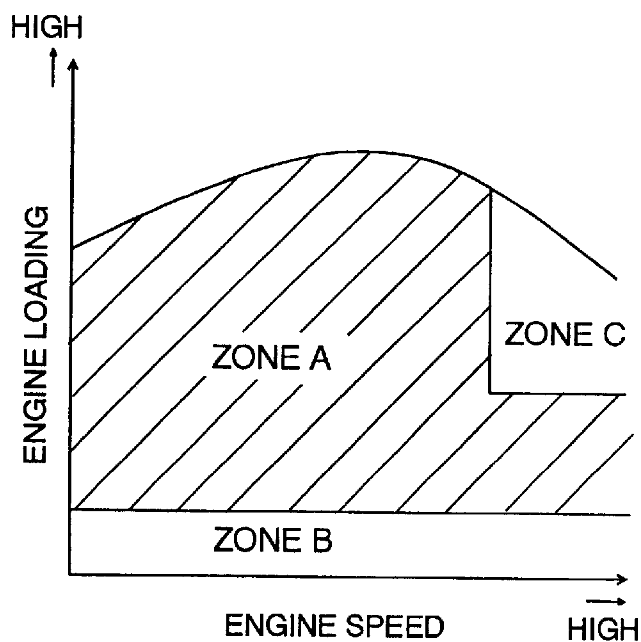
FIG. 3 is a diagram illustrating a map of fuel injection control zones for warm engine operation.
Figure 4:
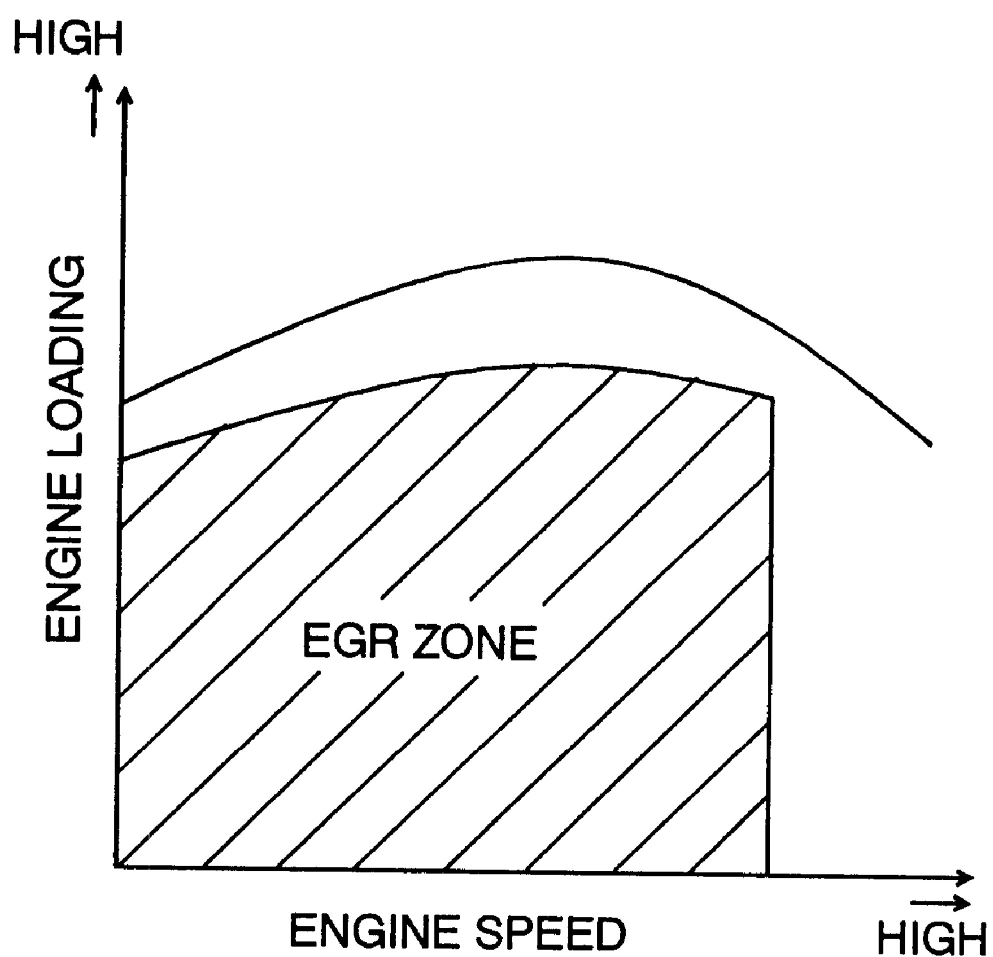
FIG. 4 is a diagram illustrating a map of exhaust gas recirculation control zone.
Figure 5A:
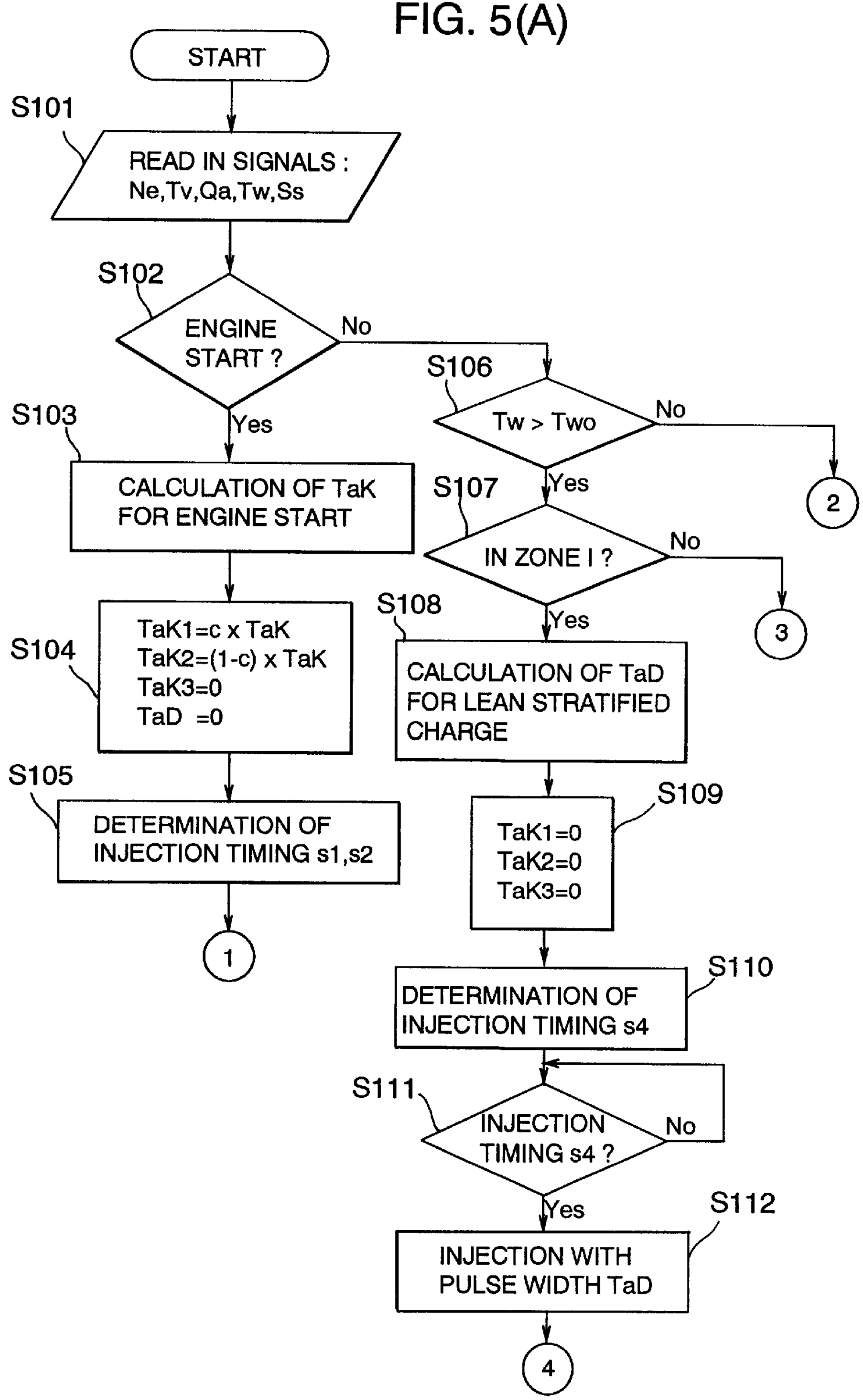
FIGS. 5(A) through 5(D) are a flow chart illustrating a sequence routine of fuel injection control for a microcomputer of an engine control unit.
Figure 5B:
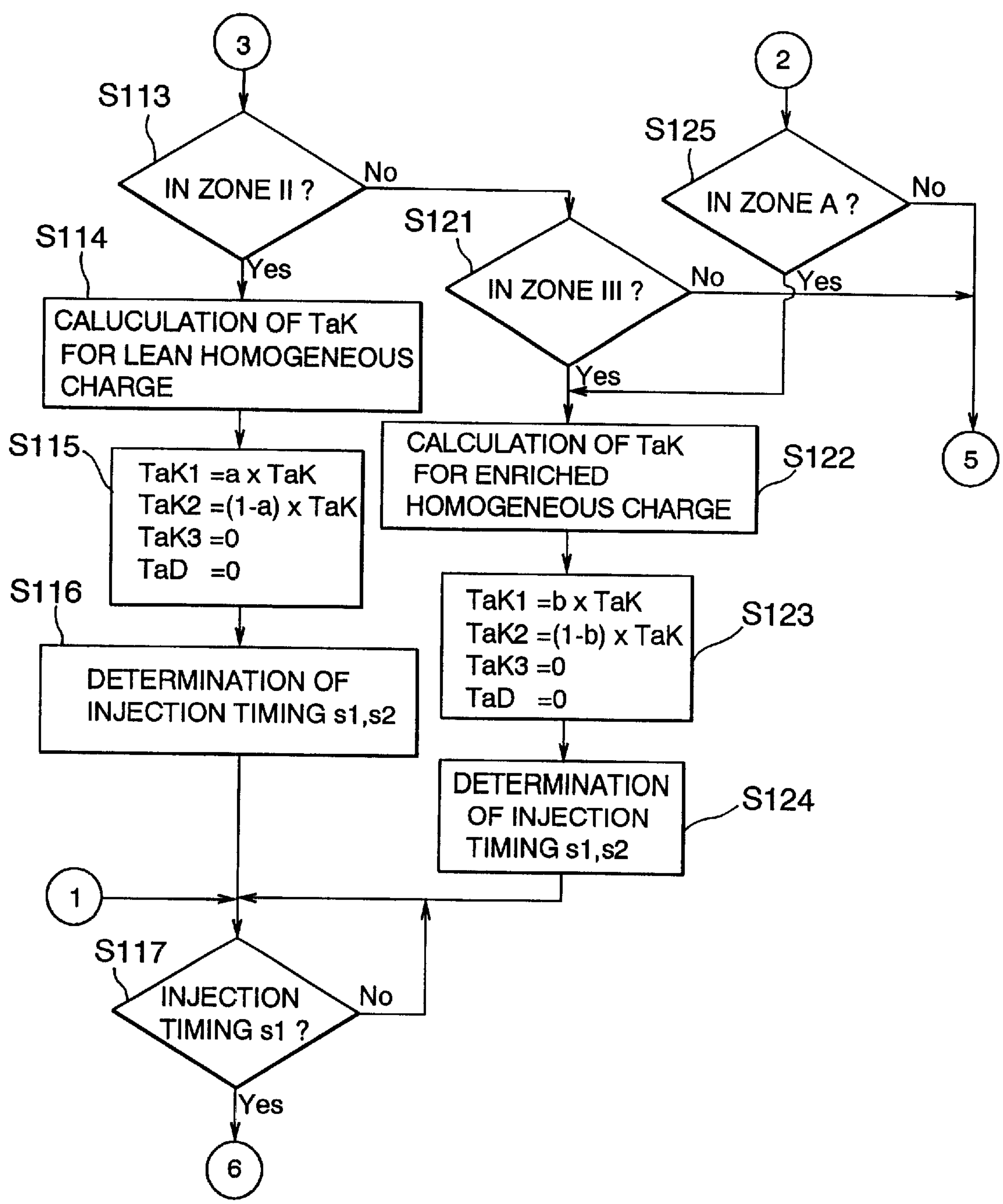
Figures 5C, 5D:
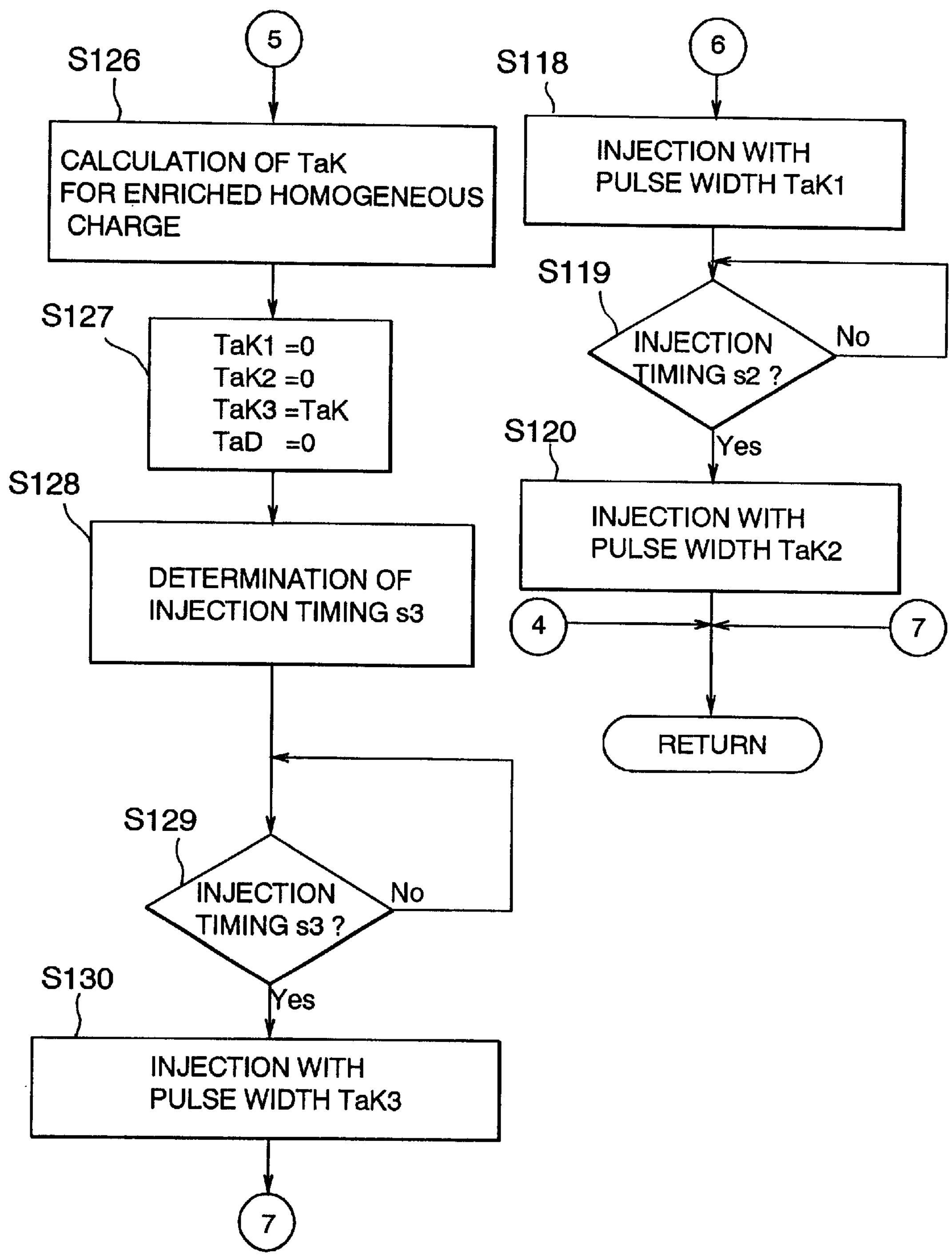

FIGS. 2 and 3 show fuel charge control maps with engine speed and loading as parameters for warm engine operations and cold engine operations, respectively, which define a lean fuel charge zone in which the engine is charged with an air-fuel mixture of $\lambda>1$ and an enriched fuel charge zone in which the engine is charged with an air-fuel mixture of $\lambda<1$ and, in another aspect, a non-split injection zone in which a given amount of fuel is delivered all at once and a split injection zone in which a given amount of fuel is delivered through in two steps or through two split injection. Specifically, the fuel charge control map shown in FIG. 2 used while the engine is in a warm condition defines five fuel charge control zones, namely a lean stratified charge zone (I), a lean homogeneous charge zone (II), and an enriched homogeneous charge zones (III)–(V). In the lean stratified charge zone (I) which is defined for lower engine loadings and lower to middle engine speeds, a given amount of fuel is sprayed all at once to cause lean stratified charge combustion immediately before an ignition timing at which the spark plug 10 is fired in a compression stroke. In the lean homogeneous charge zone (II) which is defined for lower to middle engine loadings and lower to middle engine speeds, a given amount of fuel is divided into two parts and sprayed in two steps in a intake stroke to cause lean homogeneous charge combustion. In the enriched homogeneous charge zone (III) which is defined for higher engine loadings and higher engine speeds, a given amount of fuel is divided into two parts and sprayed in two steps in a intake stroke to cause enriched homogeneous charge combustion. In the enriched homogeneous charge zone (IV) which is defined for higher engine loadings and higher engine speeds, enriched homogeneous charge combustion. In the enriched homogeneous charge zone (V) which is defined for lower engine loadings and middle to higher engine speeds, a given amount of fuel is sprayed all at once in a intake stroke to cause enriched homogeneous charge combustion. All these zones (I)–(V) are established so as not to overlap one another. The fuel charge control map shown in FIG. 3 used while the engine is in a cold condition defines three enriched homogeneous charge zones (A), (B) and (C). In the enriched homogeneous charge zone (A) which is defined for middle to higher engine loadings and lower to higher engine speeds, a given amount of fuel is divided into two parts and sprayed in two steps in a intake stroke to cause enriched homogeneous charge combustion. In both enriched homogeneous charge zone (B) which is defined for lower engine loadings and lower to higher engine speeds and enriched homogeneous charge zone (C) which is defined for higher engine loadings and higher engine speeds, a given amount of fuel is sprayed all at once in a intake stroke to cause enriched homogeneous charge combustion. These three zones (A)–(C) are established so as not to overlap one another. While the engine operates in any one of the engine control zones (II), (III) and (A) shaded in FIGS. 2 and 3 in which split injection is made in a intake stroke, the EGR system 37 is actuated to admit amounts of exhaust gas controlled by the EGR valve 39 into the intake air stream. The exhaust gas recirculation (EGR) rate, which refers to a rate of the amount of exhaust gas that is recirculated relative to the amount of exhaust gas that is produced resulting from combustion varies according to engine operating zones up to 10 to 40%. As shown in FIG. 4, the EGR zone covers the lean stratified charge zone (I), the lean homogeneous charge zone (II) and the enriched homogeneous charge zone (III) excepting a higher engine loading region for warm conditions, and the enriched homogeneous charge zone (A) excepting a higher engine loading region for cold conditions.

FIGS. 5(A) through 5(D) show a flow chart illustrating a sequence routine of fuel charge control.

As shown, when the flow chart logic commences and control proceeds directly to a function block at step S101 where signals Ne, Tv, Qa, Tw and Ss representative of various control factors such as engine speed, accelerator position, intake air quantity, cooling water temperature and a starter signal, respectively, are read into the control unit 41. Subsequently, a decision is made at step S102 as to whether the engine 1 starts. When there is an occurrence of a starter signal Ss and the engine speed Ne is lower than a specified speed, an engine start is ascertained. When the answer is affirmative, an injection pulse width TaK at the engine start is calculated at step S103. The given amount of fuel is divided into two parts for early fuel injection and later fuel injection made in an intake stroke according to a split ratio represented by a split factor c (1>0). For this purpose, the injection pulse width TaK is divided into two split injection pulse widths TaK1 which is expressed by c×TaK and TaK2 which is expressed by (1−c)×TaK at step S104. At the beginning of engine operation, a given amount of fuel is neither sprayed in non-split intake stroke injection nor in non-split compression stroke injection, and simultaneously both non-split intake stroke injection pulse width TaK3 and non-spilt compression stroke injection pulse width TaD are set to 0 (zero). Thereafter, split injection timings s1 and s2 for the early and later fuel injection are determined, respectively, at step S105. As shown by (b) in FIG. 6, the early and late split injection timings s1 and s2 are predetermined. That is, the early split injection timing s1 for the early fuel injection is dictated by an angle of rotation of the crankshaft 7 in an early half of a intake stroke and, more specifically, at a crank angle 45 to 50 degrees before top-dead-center in a intake stroke, and the late split injection is timed to start at a point or timing s2 in a later half of the intake stroke and, more specifically, at a crank angle 100 to 120 degrees after top-dead-center in the intake stroke. After the determination of early and late split injection timings s1 and s2 at step S105, a decision is made at step S117 as to whether it is the early split injection timing s1 for the early fuel injection. After waiting up to the early split injection timing s1 at step S117, the fuel injector 14 is pulsed to open to deliver the amount of fuel depending upon the early split injection pulse width TaK1 at step S118. Similarly, a decision is subsequently made at step S119 as to whether it is the late split injection timing s2 for the later fuel injection. After waiting up to the late split injection timing s2 at step S119, the fuel injector 14 is pulsed to open to deliver the amount of fuel depending upon the late split injection pulse width TaK2 at step S120. After a conclusion of the late split injection at step S120, the flow chart logic returns to restart the sequence routine.

On the other hand, when the answer to the decision as to engine start made at step S102 is negative, another decision is made at step S106 as to whether the cooling water temperature Tw is higher than a specified value Two, i.e. whether the engine 1 is in a warm condition. When the answer is affirmative, then, still another decision is made at step S107 as to whether the engine operating condition is in the lean stratified charge zone (I) for lower engine loadings and middle to higher engine speeds of the fuel charge control map for warm engine operation shown in FIG. 2. When the engine operating condition, or the engine loading and speed, is in the lean stratified charge zone (I), a non-split compression stroke injection pulse width TaD for the lean stratified charge combustion is calculated at step S108. In the lean stratified charge zone (I), neither split injection nor non-split intake stroke fuel injection is made, both split injection pulse widths Tak1 and Tak2 and non-split intake stroke injection pulse width TaK3 are set to 0 (zero) at step S109. Thereafter, a non-split compression stroke injection timing s3 is determined at step S110. As shown by (a) in FIG. 6, the non-split compression stroke injection timing s3 is predetermined. That is, the non-split compression stroke injection timing s3 is set in a later half of a compression stroke. Subsequently, a decision is made at step S111 as to whether it is the injection timing s3 for the non-split compression stroke injection. After waiting up to the non-split compression stroke injection timing s3 at step S111, the fuel injector 14 is pulsed to open to deliver the amount of fuel depending upon the non-split compression stroke injection width TaD at step S112. After a conclusion of the non-split compression stroke injection, the flow chart logic returns to restart the sequence routine.

When the answer to the decision as to engine operating condition made at step S107 is negative, another decision is subsequently made at step S113 as to whether the engine operating condition is in the lean homogeneous charge zone (II) for lower engine loadings and lower to middle engine speeds of the fuel charge control map for warm engine operation shown in FIG. 2. When the engine operating condition, or the engine loading and speed, is in the lean homogeneous charge zone (II), an injection pulse width TaK for lean homogeneous charge combustion is calculated at step S114. The given amount of fuel is divided into two parts for early fuel injection and later fuel injection made in a intake stroke according to a split ratio represented by a split factor a (1>0) at step S115. The injection pulse width TaK is divided into an early split injection pulse width TaK1 which is expressed by a×TaK and a late split injection pulse width TaK2 which is expressed by (1−a)×TaK. In the lean homogeneous charge zone (II) the given amount of fuel is neither sprayed in non-split intake stroke injection nor in non-split compression stroke injection and consequently both non-split intake stroke injection pulse width TaK3 and non-spilt compression stroke injection pulse width TaD are set to 0 (zero). Thereafter, early and late split injection timings s1 and s2 are determined as shown by (b) in FIG. 6 at step S116, After waiting up to the early split injection timing s1 at step S117, the fuel injector 14 is pulsed to open to deliver the amount of fuel depending upon the early split injection pulse width TaK1 at step S118. Similarly, after waiting up to the late split injection timing s2 at step S119, the fuel injector 14 is pulsed to open to deliver the amount of fuel depending upon the late split injection pulse width TaK2 at step S120. After a conclusion of the late split injection at step S120, the flow chart logic returns to restart the sequence routine.

When the engine operating condition is out of the lean homogeneous charge zone (II), another decision is subsequently made at step S121 as to whether the engine operating condition is in the enriched homogeneous charge zone (III) for middle to higher engine loadings and lower to higher engine speeds of the fuel charge control map for warm engine operation shown in FIG. 2. When the engine operating condition, or the engine loading and speed, is in the enriched homogeneous charge zone (III), an injection pulse width TaK for enriched homogeneous charge combustion is calculated at step S122. The given amount of fuel is divided into two early fuel injection and later fuel injection made in a intake stroke according to a split ratio represented by a split factor b (1>0) at step S123. The injection pulse width TaK is divided into an early split injection pulse width TaK1 which is expressed by b×TaK and a late split injection pulse width TaK2 which is expressed by (1−b)×TaK. In the enriched homogeneous charge zone (III) the given amount of fuel is sprayed neither in non-split intake stroke injection nor in non-split compression stroke injection and consequently both non-split intake stroke injection pulse width TaK3 and non-spilt compression stroke injection pulse width TaD are set to 0 (zero). In the same manner as in the lean homogeneous charge zone (II), early and late split injection timings s1 and s2 are determined as shown by (b) in FIG. 6 at step S124. After waiting up to the early split injection timing s1 at step S117, the fuel injector 14 is pulsed to open to deliver the amount of fuel depending upon the early split injection pulse width TaK1 at step S118. Similarly, after waiting up to the late split injection timing s2 at step S119, the fuel injector 14 is pulsed to open to deliver the amount of fuel depending upon the late split injection pulse width TaK2 at step S120. After a conclusion of the late split injection at step S120, the flow chart logic returns to restart the sequence routine.

When the answer to the decision as to the enriched homogeneous charge combustion is negative, this indicates that the engine operating condition is in either the enriched homogeneous charge zone (IV) for higher engine loadings and higher engine speeds or the enriched homogeneous charge zone (V) for lower engine loadings and middle to higher engine speeds, then, an injection pulse width TaK for enriched homogeneous charge combustion is calculated at step S126. In the zone (IV) or (V), the given amount of fuel is sprayed all at once in a intake stroke, the injection pulse width TaK is employed as a non-split intake stroke injection pulse width TaK3 at step S127. Simultaneously, both split injection pulse widths Tak1 and Tak2 and non-split compression stroke injection pulse width TaD are set to 0 (zero). Thereafter, a non-split intake stroke injection timing s4 is determined at step S128. As shown by (c) in FIG. 6, the non-split intake stroke injection timing s4 is predetermined. That is, the non-split intake stroke injection timing s4 is set such that the non-split intake stroke injection is started at approximately the midpoint of a intake stroke. Subsequently, after waiting up to the non-split intake stroke injection timing s4 at step S129, the fuel injector 14 is pulsed to open to deliver the amount of fuel depending upon the non-split intake stroke injection width TaK3 at step S130. After a conclusion of the non-split intake stroke injection, the flow chart logic returns to restart the sequence routine.

Further, when the answer to the decision as to cooling water temperature Tw made at step S106 is negative, this indicates that the engine 1 is still in a cold condition, then, another decision is subsequently made at step S125 as to whether the engine operating condition is in the enriched homogeneous charge zone (A) for middle to middle to higher engine loadings of the fuel charge control map for cold engine operation shown in FIG. 3. When the engine operating condition, or the engine loading and speed, is in the enriched homogeneous charge zone (A), steps S122–S124 and S117 through S120 are taken to cause early and late split injection in a intake stroke to deliver the given amounts of fuel depending upon the early and late split injection pulse widths TaK1 and TaK2.

On the other hand, when the answer to the decision as to engine operating condition made at step S125 is negative, this indicates that the engine operating condition is either the enriched homogeneous charge zone (B) for lower engine loadings or the enriched homogeneous charge zone (C) for higher engine loadings and higher engine speeds, then, a given amount of fuel is sprayed in non-split intake stroke injection. An injection pulse width TaK for enriched homogeneous charge combustion is calculated at step S126 and is employed as a non-split intake stroke injection pulse width TaK3 at step S127. Simultaneously, both split injection pulse widths Tak1 and Tak2 and non-split compression stroke injection pulse width TaD are set to 0 (zero). After waiting up to the non-split intake stroke injection timing s4 at step S129, the fuel injector 14 is pulsed to open to deliver the amount of fuel depending upon the non-split intake stroke injection width TaK3 at step S130. After a conclusion of the non-split intake stroke injection, the flow chart logic returns to restart the sequence routine.

In the engine operation control system according to the above embodiment, the midpoint m between the early and late split injection timings s1 and s2 is put before the midpoint M of a intake stroke which is at a crank angle 90 degrees after top-dead-center. Each injection pulse split factor a, b, c is set approximately 0.5, which divides a given amount of fuel into two exact halves for early and later fuel injection.

Figure 6:
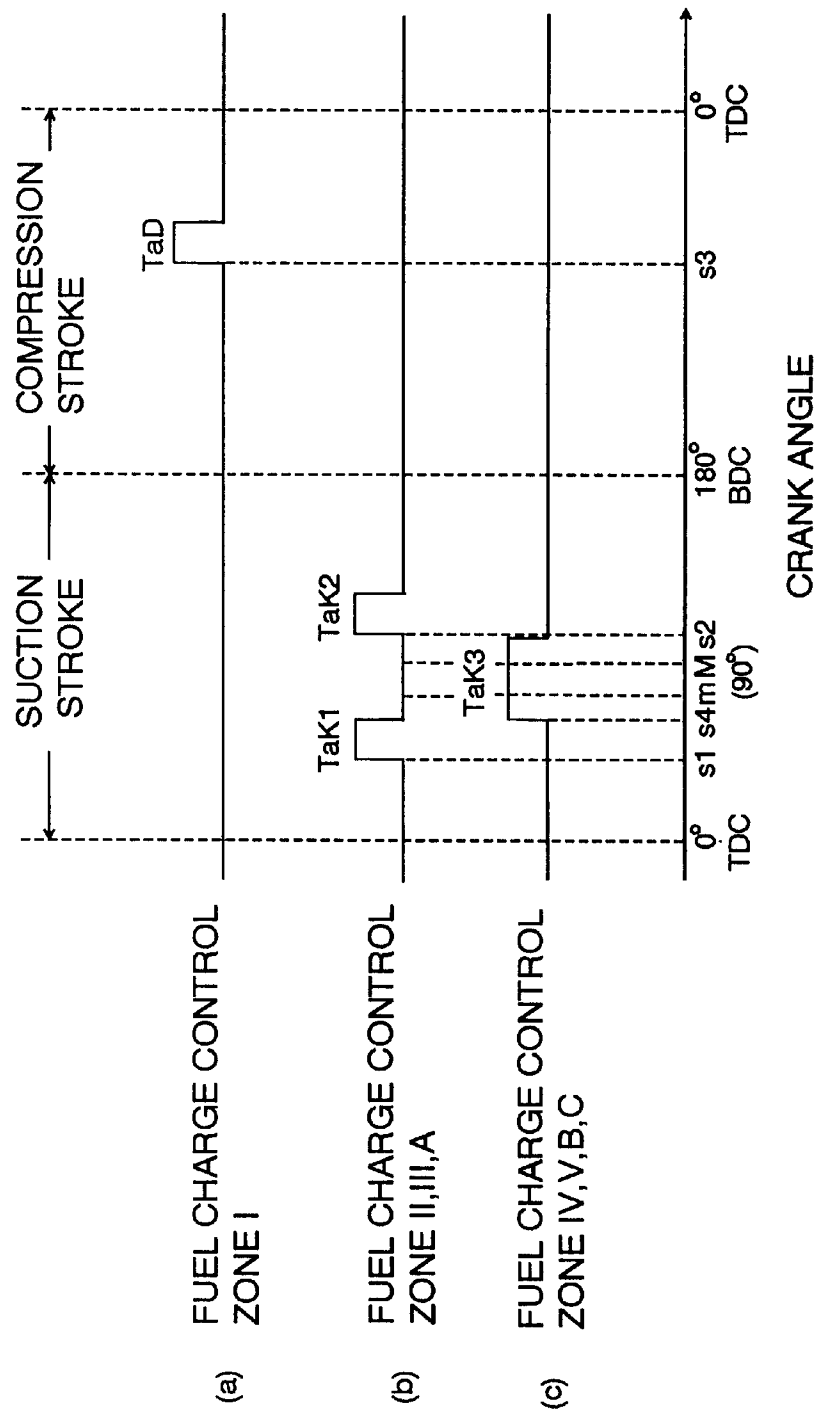
FIG. 6 is a time chart of fuel injection for various engine operating zones.

In operation of the engine control system according to the above embodiment of the invention, immediately after an engine start, a given amount of fuel is divided into two parts and sprayed through early and late split injection in a intake stroke as shown by (b) in FIG. 6. During idling after the engine start, while the engine 1 is monitored to be still in a cold condition in which the cooling water temperature Tw is lower than the specified value Two and in the enriched homogeneous charge zone (B) for lower engine loadings or the enriched homogeneous charge zone (C) for higher engine loadings and higher engine speeds, a given amount of fuel is sprayed all at once in a intake stroke as shown by (c) in FIG. 6. Further, during in cold engine operation, when the engine 1 operates in the enriched homogeneous charge zone (A) for middle to higher engine loadings, a given amount of fuel is divided into two parts and sprayed through early and late split injection in a intake stroke as shown (b) in FIG. 6.

After the cooling water temperature Tw reaches the specified value Two, or during in warm engine operation, a given amount of fuel is divided into two parts and sprayed through early and late split injection in a intake stroke as shown (b) in FIG. 6 when the engine 1 operates in the lean homogeneous charge zone (II) for lower to middle engine loadings and lower to middle engine speeds or in the enriched homogeneous charge zone (III) for middle to higher engine loadings. On the other hand, a given amount of fuel is sprayed all at once in a compression stroke as shown by (a) in FIG. 6 when the engine 1 operates in the lean stratified charge zone (I) for lower engine loadings and lower to middle engine speeds or in a intake stroke as shown by (c) in FIG. 6 when the engine 1 operates in the enriched homogeneous charge zone (IV) for higher engine loadings and higher engine speeds or in the enriched homogeneous charge zone (V) for lower engine loadings and middle to higher engine speeds. Further, while the engine operates in the zone in which a given amount of fuel is sprayed through early and late split injection in a intake stroke, i.e. in any one of the enriched homogeneous charge zone (A), the lean homogeneous charge zone (II) and the enriched homogeneous charge zone (III), the EGR valve 39 is actuated to admit exhaust gas in the exhaust line 31 partly into an intake air stream in the intake line 25. Practically, the exhaust gas recirculation (EGR) rate is significantly low while the engine operates with higher loadings in the enriched homogeneous charge zone (A) and the enriched homogeneous charge zone (III). The EGR valve 39 may be shut in the higher loading zone as shown in FIG. 4.

When a given amount of fuel is divided into two parts and sprayed in two steps through early and late split injection in a intake stroke, the part of fuel sprayed through the early split injection is homogeneously diffused in the combustion chamber 6 with an increase in volume of the combustion chamber 6 following a down stroke of the piston 5 with absence of fuel injection before the late split injection. Subsequently, the part of fuel splayed through the late split injection is diffused, so as to provide a homogeneous distribution of air-fuel mixture in the combustion chamber 6. As a result, the combustion velocity is increased in a piston stroke following a compression stroke with an effect of providing a rise in combustion efficiency and a drop in exhaust gas temperature. Further, the early and late split injection which is shifted as one whole a little to the early side of a intake stroke prevents or significantly reduces sticking of sprayed fuel through the late split injection to the side wall of the cylinder bore 2 when the piston 5 reaches near bottom-dead-center or at the end of a intake stroke, which is always desirable for a homogeneous distribution of fuel in the combustion chamber 6. Furthermore, there is provided a long time before fuel ignition for which fuel is allowed to be sprayed and evaporate. The acceleration of accomplishment of a homogeneous distribution of fuel and evaporation of fuel is significantly enhanced by the mutually potentiating effect, so that a big raise in combustion velocity is further provided with an effect of lowering the temperature of exhaust gas.

In order to empirically demonstrate the extent of the improvement of combustibility, measurements of combustion stability and changes in specific fuel consumption of an engine were made in such a manner that, while a given amount of fuel was divided into two substantially equal parts for early and late split injection, the early split injection was fixedly timed to start at a point or timing s1 an early stage of a intake stroke and the late split injection was timed to start at a point s2 changing in a period of time lying between a intake stroke and a subsequent compression stroke. The result of measurements is shown in FIGS. 7(A) and 7(B).

Figure 7A:
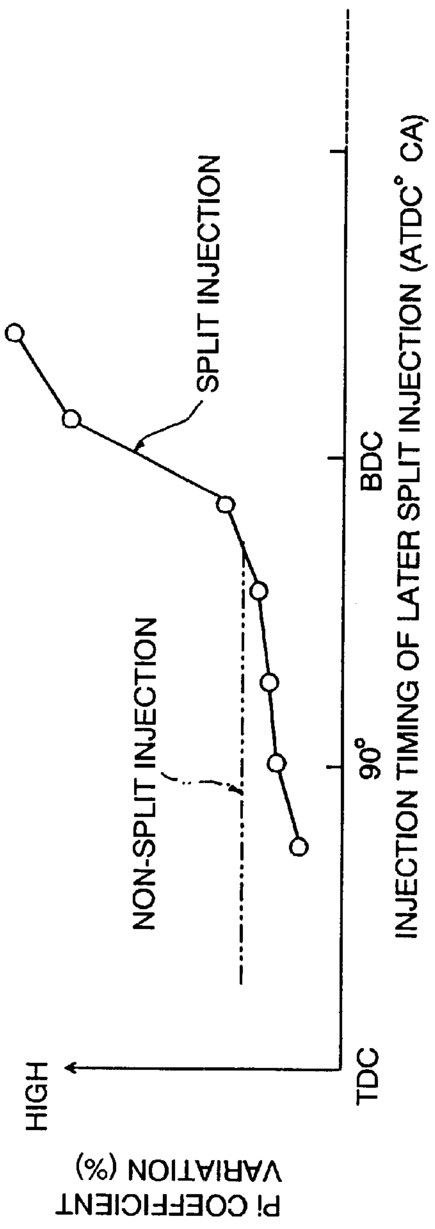
FIGS. 7(A) and 7(B) are graphs illustrating specific fuel consumption and Pi coefficient variation with respect to later fuel injection timing.
Figure 7B:
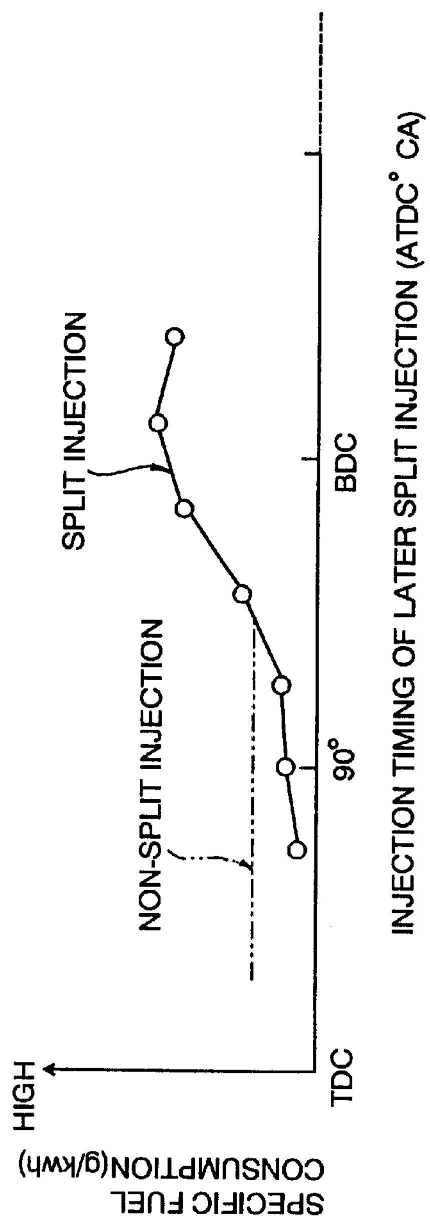

Referring to FIG. 7(A) showing the coefficient variation of indicated mean effective pressure (Pi coefficient variation), it is proved that, as the early split injection timing s1 is advanced, the Pi coefficient variation and the specific fuel consumption lower. In more detail, when the early split injection is timed to start at a point s1 before reaching a crank angle of 120° after top-dead center in an exhaust stroke, i.e. at a point in an early-to-middle division of a intake stroke, both Pi coefficient variation and specific fuel consumption are reduced more as compared to the case where a given amount of fuel is sprayed through non-split injection. The Pi coefficient variation and the specific fuel consumption are reduced greatly as the late split injection timing s2 is advanced. Accordingly, in a zone where the given amount of fuel, and hence a injection pulse width, is small such as a zone for low loading and low speed engine operating zones, the combustibility is even more improved greatly when the late split injection is advanced so as to end before an crank angle of 120° after top-dead center.

Figure 8:
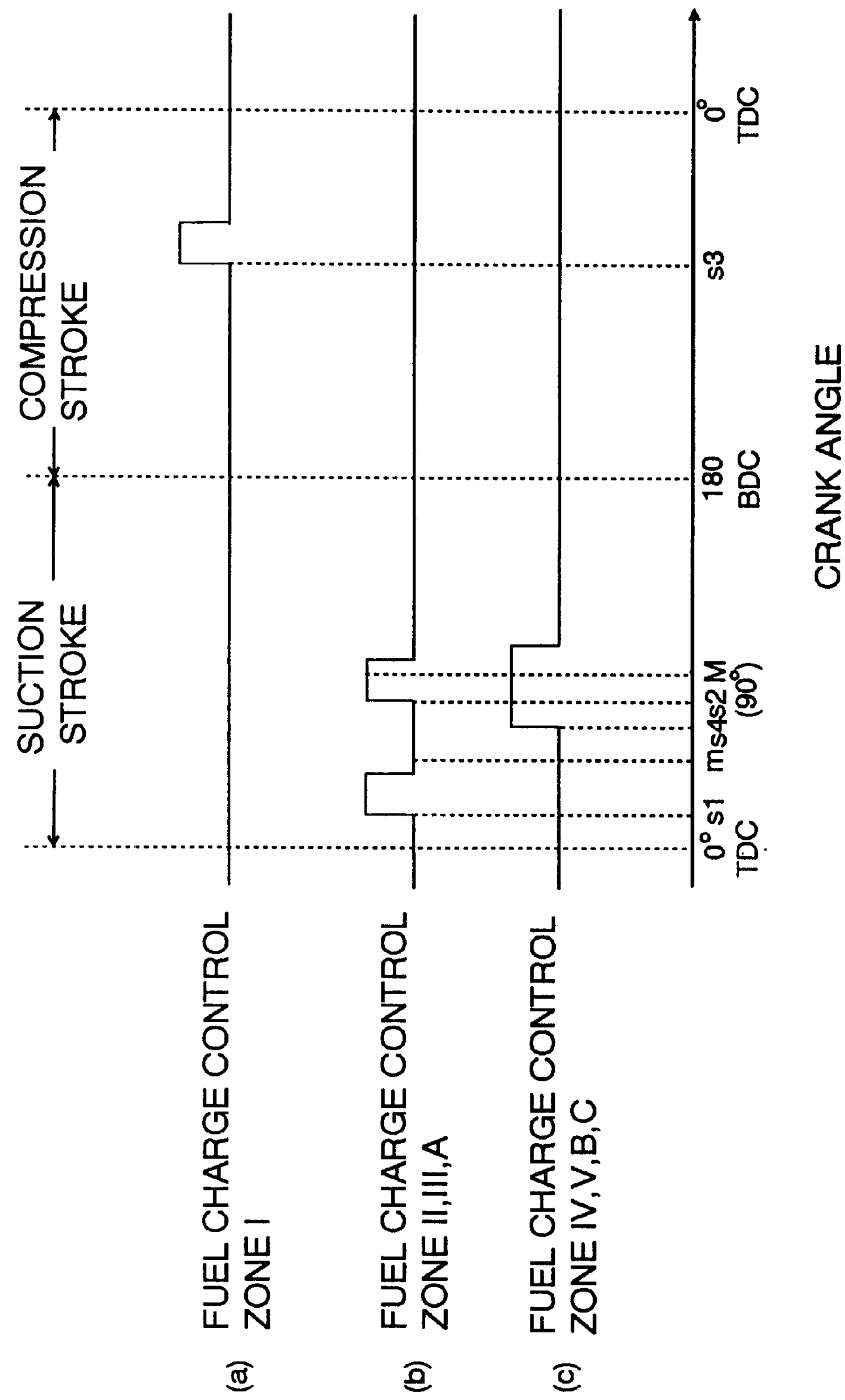
FIG. 8 is another time chart of fuel injection for various engine operating zones.

As shown by (b) in FIGS. 8, when the midpoint of a late split injection period is put at a point, for example at a crank angle of 86° after top-dead center, where the piston 5 attains the highest lowering speed before the midpoint M of a intake stroke, the late split injection is made in a condition where the piston 5 moves down with the highest speed with an effect of causing an intake air stream to enter with the highest speed, a spray of fuel through the late split injection is homogeneously distributed in the combustion chamber 6 by the intake air stream, which provides more enhanced improvement of the combustibility. In this instance, the timing of early split injection s1 is fixed at a crank angle of 20° after top-dead center, and the late split injection timing s2 is fixed at a crank angle of 70° after top-dead center.

Figure 9A:
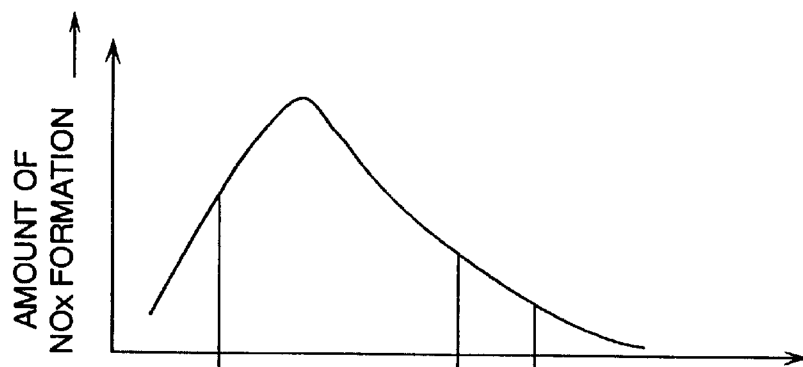
FIGS. 9(A) and 9(B) are graphs showing the amount of NOx formation and specific fuel consumption with respect to air-fuel ratio.
Figure 9B:
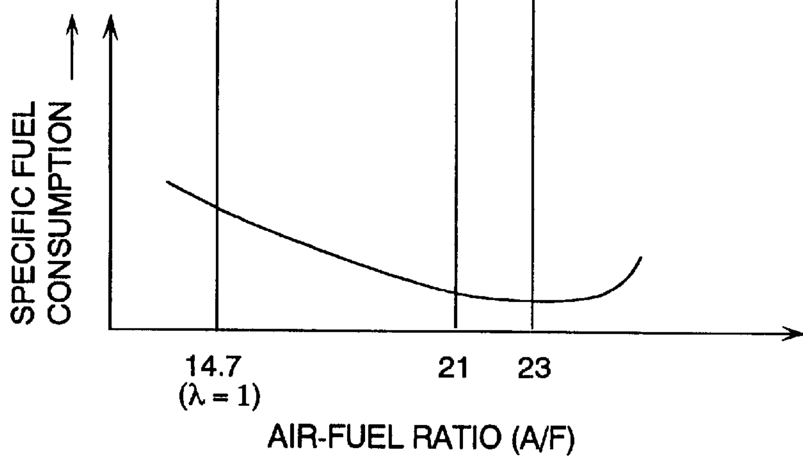

According to the engine control system described above, a given amount of fuel at an engine start is sprayed through the split injection, the fuel is evaporated without overly enriching the air-fuel mixture during starting, enabling the engine 1 to show both lean charge combustion performance and improved startability. Since, while the engine 1 operates in a cold condition under which fuel becomes somewhat inferior in evaporation and combustibility, the split injection is performed in the enriched homogeneous charge zone (A), evaporation of an enriched fuel mixture is accelerated and its combustibility is improved. Further, since the split injection is performed in the lean homogeneous charge zone (II) in a warm condition, a lean limit of an the air-fuel ratio is risen due to the improvement of homogeneous fuel distribution. As a result, as shown in FIGS. 9(A) and 9(B), the specific fuel consumption is improved and the amount of NOx formation is greatly reduced.

Figure 10A:
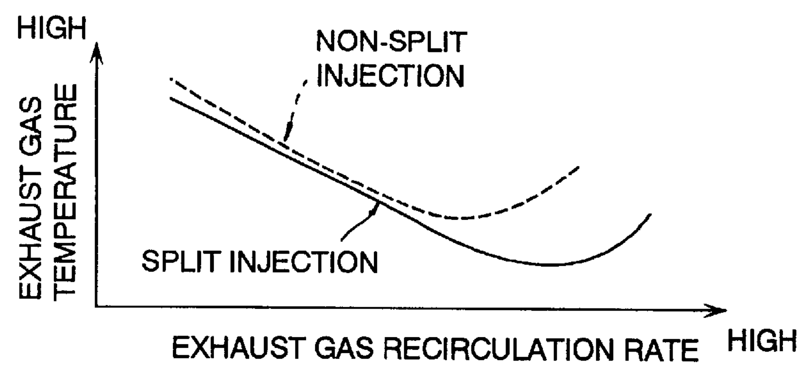
FIGS. 10(A) and 10(B) are graphs showing the temperature of exhaust gas and specific fuel consumption with respect to exhaust gas recirculation rate.
Figure 10B:
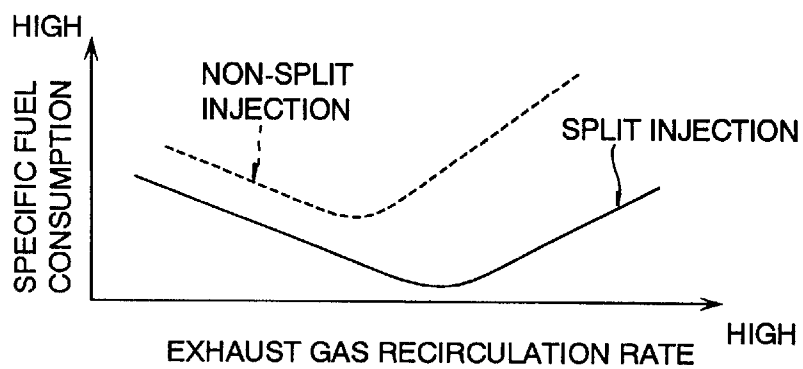

Furthermore, while an air stream is admitted into the combustion chamber 6 through only one intake port 12 other than the intake port 12 with the air stream control valve 30 installed therein while the air stream control valve 30 is closed, a swirl of intake air is created in the combustion chamber 6, accelerating a homogeneous distribution of fuel with an effect of improving combustibility of the fuel. The EGR system 37 is actuated to admit exhaust gas in the exhaust line 31 partly into an intake air stream in the intake line 25 in the enriched homogeneous charge zone (A), the lean homogeneous charge zone (II) and the enriched homogeneous charge zone (III), in each zone a given amount of fuel being sprayed through the early and late split injection in a intake stroke. Due to the combustibility of fuel mixture resulting from the split injection in a intake stroke, thee exhaust gas can be recirculated into an intake air stream with an exhaust gas recirculation (EGR) rate up to 10–40% and the limit rate of exhaust gas recirculation is consequently risen. As shown in FIGS. 10(A) and 10(B), as compared to the case where a given amount of fuel is sprayed all at once through the non-split injection in a intake stroke, the specific fuel consumption is lowered resulting from a drop in pumping loss and the temperature of exhaust gas is lowered.

Figure 11:
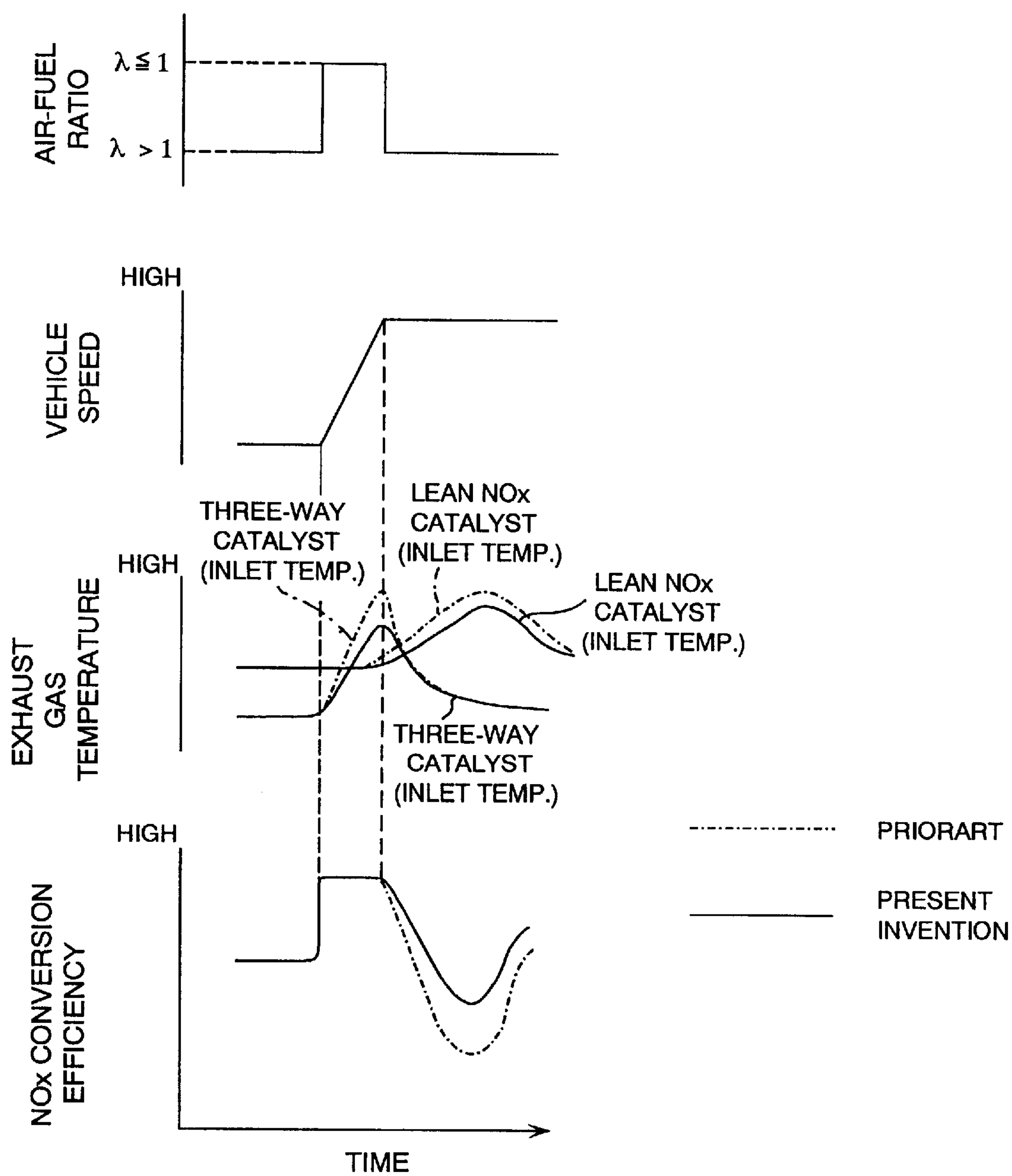
FIG. 11 is a time chart of changes in air-fuel ratio, the temperature of exhaust gas and the amount of NOx formation with respect to a change in vehicle speed.
Figure 12:
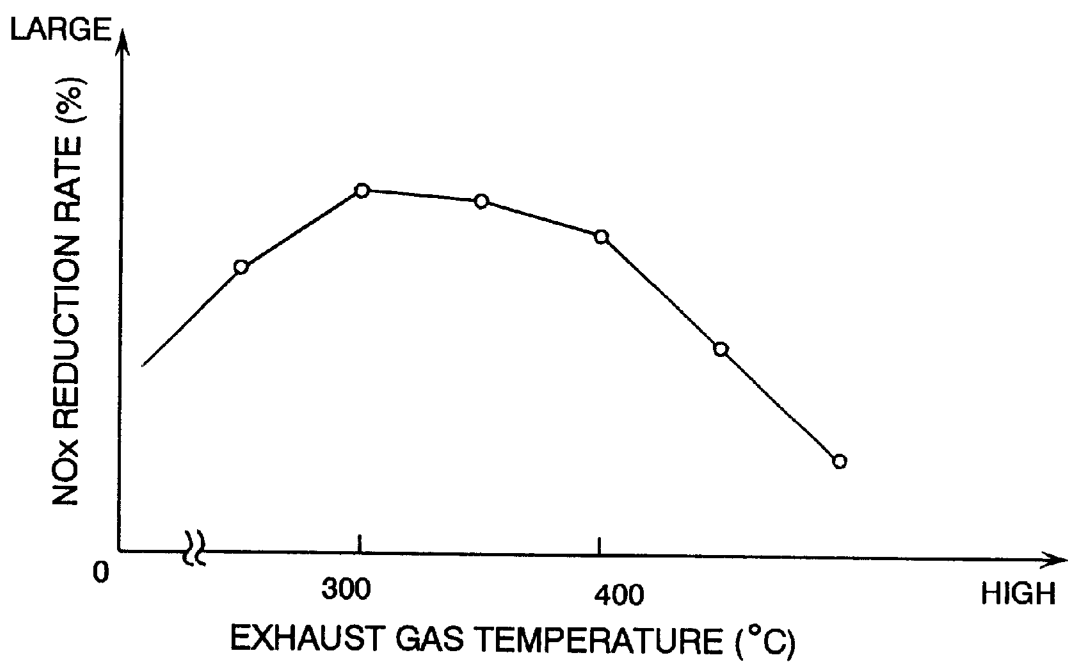
FIG. 12 is a diagram illustrating a variation of the map of fuel injection control zones for warm engine operation shown in FIG. 2.

While the engine operates in the lean stratified charge zone (I), a given amount of fuel is sprayed all at once through the non-split injection in a compression stroke to create a dense stratum of a fuel mixture around the spark plug 10 to stratify the fuel mixture in the combustion chamber 6. As was previously described, because the fuel injector 14 is positioned off the vertical axis of the cylinder bore 2 to spray fuel from the side of combustion chamber 6, easily creating a stratified distribution of fuel mixture with an effect of improving the combustibility of fuel mixture. As a result, the temperature of exhaust gas is lowered sufficiently to improve the NOx conversion performance of lean NOx conversion catalyst 34. Specifically, as shown in FIG. 11 showing changes in exhaust gas temperature and NOx conversion performance with respect to a change in vehicle speed, while the vehicle runs with at a constant speed under an ordinary condition, when the engine operating condition falls in the enriched stratified charge zone (I) for lower engine loadings and lower to middle engine speeds in which fuel is sprayed through the non-split injection, the inlet temperature of exhaust gas to the three-way catalyst 33 is lower than that to the lean NOx conversion catalyst 34 disposed downstream from the three-way catalyst 33, when the engine operating condition changes from that condition due, for example, to acceleration through stepping on the accelerator pedal and falls in the enriched homogeneous charge zone (II), while the engine operates with a fuel mixture enriched to be $\lambda<1$, the vehicle speeds up. As a result, the inlet temperature of exhaust gas to the three-way catalyst 33 sharply rises and becomes higher than that to the lean NOx conversion catalyst 34. A rise in the inlet temperature of exhaust gas to the lean NOx conversion catalyst 34 is gradual due to a separation from the three-way catalyst 33. Even if NOx are increased in the exhaust gas resulting from the acceleration, they are catalyzed through the three-way catalyst 33, so that these catalysts 33 and 34 perform with a high NOx conversion performance as one whole. When the engine 1 is put under ordinary condition due to releasing the accelerator pedal and, as a result, the engine operating condition falls in the lean stratified charge zone (I) for lower engine loadings and lower to middle engine speeds in which fuel is sprayed through the non-split injection, the speed of vehicle becomes constant. According to the prior art engine control system, because the inlet temperature of exhaust gas to the lean NOx conversion catalyst 34 has risen in this state, the NOx conversion performance of lean NOx conversion catalyst 34 is significantly lowered following a change in air-fuel ratio to the lean side as shown by a dotted broken line in FIG. 11. However, according to the engine control system of the invention, the split injection is performed in a intake stroke in the enriched homogeneous charge zone (III), the temperature of exhaust gas is entirely lowered as shown by a solid line in FIG. 11. A decline in NOx conversion performance due to a rise in the temperature of lean NOx conversion catalyst 34 is restrained as shown in FIG. 12.

Figure 13:
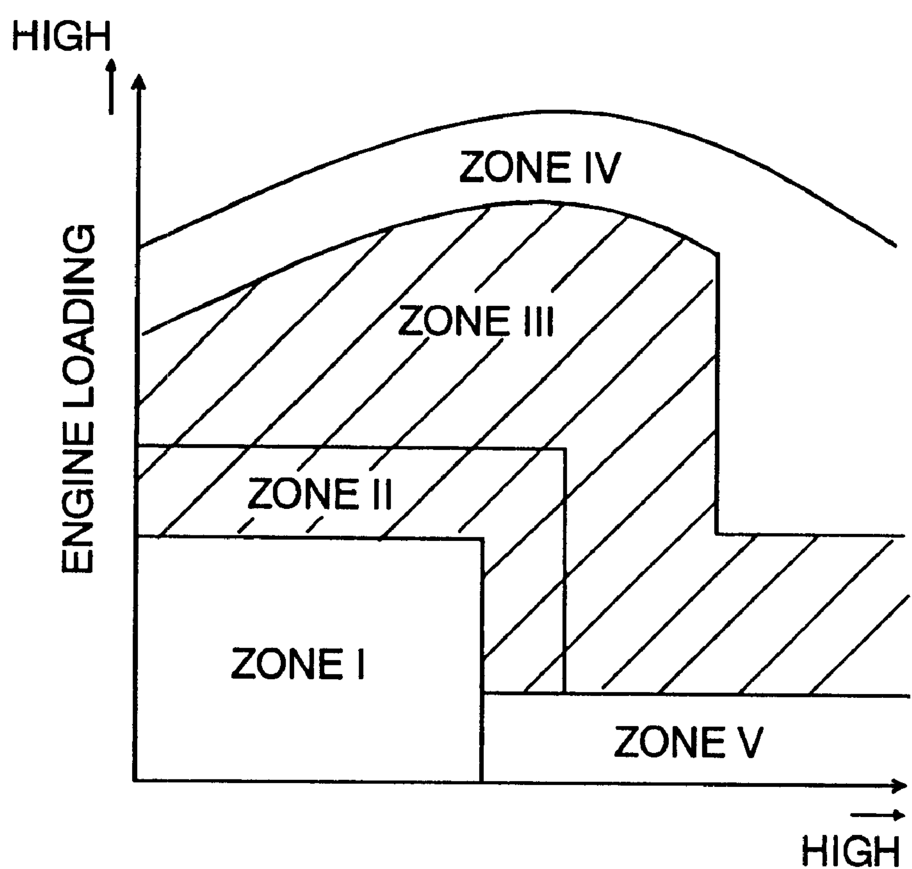
FIG. 13 is a diagram illustrating another variation of the map of fuel injection control zones for warm engine operation shown in FIG. 2.

FIG. 13 show a fuel charge control map for cold engine operation which is similar to that shown in FIG. 2 but has an enriched homogeneous charge zone (IV) is expanded above an enriched homogeneous charge zone (III). When using the fuel charge control map in the fuel charge control shown in FIGS. 5(A) through 5(D), the exhaust gas recirculation control is executed while the engine operates in the EGR zone shown in FIG. 4 which covers the lean stratified charge zone (I), the lean homogeneous charge zone (II) and the enriched homogeneous charge zone (III).

Figure 14:
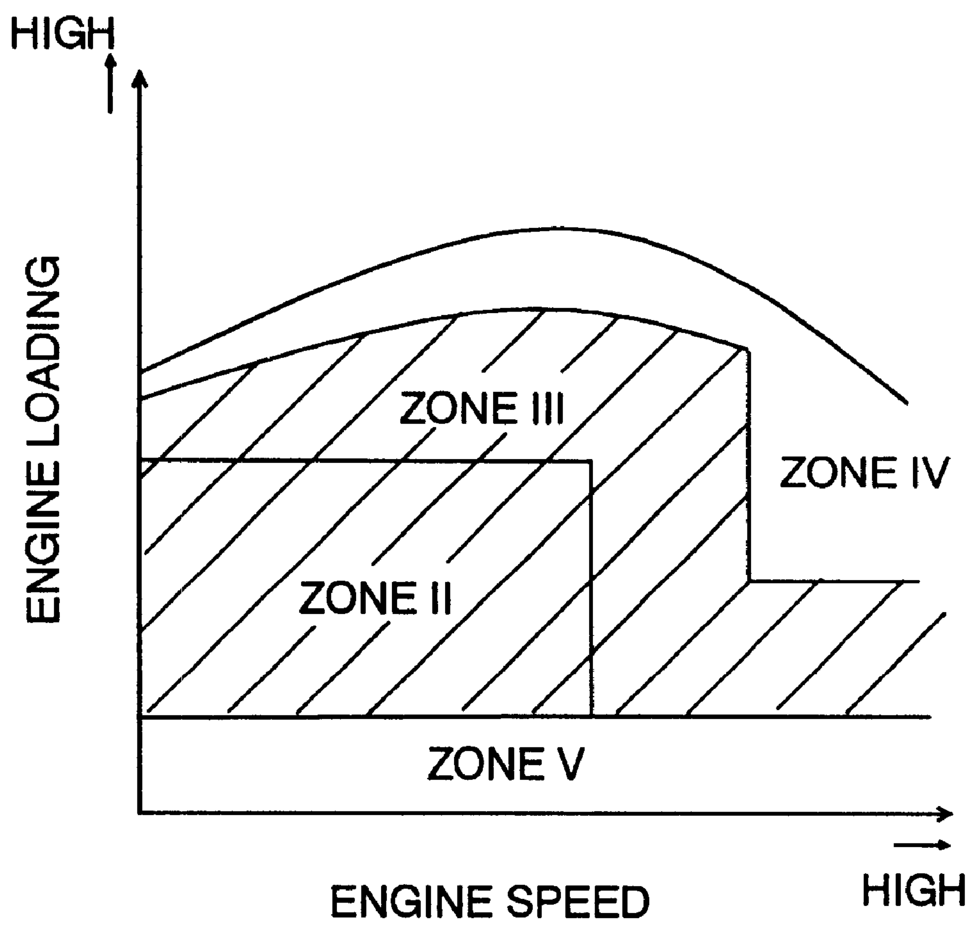
FIG. 14 is a graph of a drop ratio of the amount of NOx formation relative to the temperature of exhaust gas.

FIG. 14 show a fuel charge control map for cold engine operation which is suitably used for fuel charge control of a direct injection-spark ignition engine of a type which does not have a stratified charge combustion feature. As shown in FIG. 14, the fuel charge control map is similar to that shown in FIG. 13 but, while having no lean stratified charge zone (I), defines an enriched homogeneous charge zone (V) lying over possible engine speeds in which non-split injection is made. This type of direct injection-spark ignition engine has no necessity of having a piston formed with a top cavity and provides a reduction in heat loss consequently.

In place of performing the split injection according to the fuel charge zones, the spilt injection may be made while it is monitored that the lean NOx conversion catalyst 34 is in a temperature range higher than, for example, 400° C. In this instance, the temperature of exhaust gas is controlled according to the temperature of lean NOx conversion catalyst 34, so as to prevent the lean NOx conversion catalyst 34 from being over heated. The temperature of lean NOx conversion catalyst 34 may be estimated by the inlet temperature of exhaust gas.

The engine control system of the invention may be employed to control an engine not operative with a lean mixture, such as an engine which is operated with a stoichiometric mixture in a partial loading zone and with an enriched mixture in a full loading zone, and an engine which is operated with a stoichiometric mixture over a full range of loadings. Even in these cases, the split injection prevents the lean NOx catalyst from a rise in temperature in excess and it is not always necessary to use the lean NOx conversion catalyst 34 but may replace it with, for example, a three-way catalyst.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An engine control system for a direct injection-spark ignition type of engine which is equipped with a fuel injector for spraying fuel directly into a combustion chamber and an exhaust system having a lean NOx conversion catalyst for lowering an emission level of nitrogen oxides (NOx) in exhaust gas at an air-fuel ratio of $\lambda>1$ for controlling the engine to operate with a fuel charge of $\lambda>1$ in a zone of partial engine loadings, said engine control system comprising:

engine operating condition monitoring means for monitoring engine operating conditions; and fuel injection control means for, while said engine operating condition monitoring means monitors engine operating conditions in said partial engine loading zone, dividing a given amount of fuel into two parts which are intermittently delivered through early and late split injection, respectively, in a intake stroke, and controlling said fuel injector such that a midpoint between points at which said early and late split injection are timed respectively to start, respectively, is before a midpoint of a intake stroke.

2. The engine control system as defined in claim 1, wherein said late split injection is timed to start at a point in one of first and middle divisions of three substantially equal divisions of a intake stroke of said cylinder piston.

3. The engine control system as defined in claim 2, wherein said late split injection is timed to end at a point in one of first and middle divisions of three substantially equal divisions of a intake stroke of said cylinder piston while said engine operating condition monitoring means monitors engine operating conditions in a lower engine speed zone.

4. The engine control system as defined in claim 2, wherein a midpoint of said late split injection is timed to be at a point before said midpoint of a intake stroke of said cylinder piston at which said cylinder piston attains a maximum down speed.

5. The engine control system as defined in claim 3, wherein a midpoint of said late split injection is timed to be at a point before said midpoint of a intake stroke of said cylinder piston at which said cylinder piston attains a maximum down speed.

6. An engine, control system for a direct injection-spark ignition type of engine which is equipped with a fuel injector for spraying fuel directly into a combustion chamber and an exhaust system having a lean NOx conversion catalyst for lowering an emission level of nitrogen oxides (NOx) in exhaust gas at an air-fuel ratio of $\lambda>1$ for controlling the engine to operate with a lean fuel charge in a zone of partial engine loadings and with a fuel mixture enriched to be $\lambda<1$, said engine control system comprising:

engine operating condition monitoring means for monitoring engine operating conditions;

exhaust gas recirculation means for recirculating exhaust gas partly into said intake system from said exhaust system; and fuel injection control means for, while the engine is in a warm condition and said engine operating condition monitoring means monitors engine operating conditions in said partial engine loading zone, dividing a given amount of fuel into two parts which are intermittently delivered through early and late split injection respectively in an intake stroke of said cylinder piston, controlling said fuel injector such that a midpoint between points at which said early and late split injection are timed respectively to start is before a midpoint of an intake stroke of said cylinder piston and causing said exhaust gas recirculation system to admit exhaust gas into an intake air stream introduced into the engine in said partial engine loading zone, wherein said late split injection is timed to start at a point in one of first and middle divisions of three substantially equal divisions of an intake stroke of said cylinder piston and timed to end at a point in one of first and middle divisions of three substantially equal divisions of an intake stroke of said cylinder piston while said engine operating condition monitoring means monitors engine operating conditions in a lower engine speed zone.

7. The engine control system as defined in claim 6, wherein a midpoint of said late split injection is timed to be at a point before said midpoint of a intake stroke of said cylinder piston at which said cylinder piston attains a maximum down speed.

8. The engine control system as defined in claim 6, wherein a midpoint of said late split injection is timed to be at a point before said midpoint of a intake stroke of said cylinder piston at which said cylinder piston attains a maximum down speed.

9. A method of controlling a direct injection-spark ignition type of engine which is equipped with a fuel injector for spraying fuel directly into a combustion chamber and an exhaust system having a lean NOx conversion catalyst for lowering an emission level of nitrogen oxides (NOx) in exhaust gas at an air-fuel ratio of $\lambda>1$ for controlling the engine to operate with a lean fuel charge in a zone of partial engine loadings and with a fuel mixture enriched to be $\lambda\leqq1$, said method of controlling an engine comprising the steps of:

monitoring a temperature of said lean NOx conversion catalyst; and dividing a given amount of fuel into two parts which are intermittently delivered through early and late split injection, respectively, in an intake stroke of said cylinder piston while said lean NOx conversion catalyst is at a temperature higher than a specified level; and controlling said fuel injector such that a midpoint between points at which said early and late split injection are timed respectively to start is before a midpoint of an intake stroke of said cylinder piston.

10. The method of controlling an engine as defined in claim 9, wherein said late split injection is timed to start at a point in one of first and middle divisions of three substantially equal divisions of an intake stroke of said cylinder piston.

11. The method of controlling an engine as defined in claim 10, wherein said late split injection is timed to end at a point in one of first and middle divisions of three substantially equal divisions of an intake stroke of said cylinder piston while an engine operating condition monitoring means monitors engine operating conditions in a lower engine speed zone.

12. The method of controlling an engine as defined in claim 10, wherein a midpoint of said late split injection is timed to be at a point before said midpoint of an intake stroke of said cylinder piston at which said cylinder piston attains a maximum down speed.

13. The method of controlling an engine as defined in claim 11, wherein a midpoint of said late split injection is timed to be at a point before said midpoint of an intake stroke of said cylinder piston at which said cylinder piston attains a maximum down speed.

* * * * *